United States Patent [19]
Pinson

[11] Patent Number: 4,730,154
[45] Date of Patent: Mar. 8, 1988

[54] VARIABLE INERTIA ENERGY STORAGE SYSTEM

[75] Inventor: George T. Pinson, Huntsville, Ala.

[73] Assignee: The Boeing Company, Seattle, Wash.

[21] Appl. No.: 890,928

[22] Filed: Jul. 31, 1986

[51] Int. Cl.$^4$ .......................... H02K 7/02; H02P 9/04
[52] U.S. Cl. ........................................ 322/4; 74/572; 290/54
[58] Field of Search ................ 322/4; 290/54; 74/572

[56] References Cited

U.S. PATENT DOCUMENTS

| | | | |
|---|---|---|---|
| 3,248,967 | 5/1966 | Lewis | 74/572 |
| 3,317,765 | 5/1967 | Cone | 322/4 X |
| 3,970,917 | 7/1976 | Diggs | 322/4 |
| 4,446,418 | 5/1984 | Richardson | 322/4 |
| 4,509,006 | 2/1985 | Pinson | 322/4 |
| 4,546,264 | 7/1985 | Pinson | 290/54 |

FOREIGN PATENT DOCUMENTS

| | | | |
|---|---|---|---|
| 0184745 | 9/1985 | Japan | 74/572 |
| 0201138 | 10/1985 | Japan | 74/572 |

Primary Examiner—R. J. Hickey
Attorney, Agent, or Firm—Finnegan, Henderson, Farabow, Garrett & Dunner

[57] ABSTRACT

A variable inertia energy storage system for storing large amounts of mechanical energy for an extended period of time on land or on a mobile vehicle. The energy storage system can also be used for generating electrical power for use on demand by a subsystem or the like.

5 Claims, 4 Drawing Figures

VARIABLE INERTIA ENERGY STORAGE SYSTEM

BACKGROUND OF THE INVENTION

This invention relates to an energy storage system and more particularly, but not by way of limitation, to a variable inertia energy storage system for storing large amounts of mechanical energy for an extended period of time on land or on a mobile vehicle.

Heretofore there have been a large number of different methods used and systems proposed for storing electrical power. These systems include the classical methods associated with nuclear power generating stations along with fuel cells, solar cells, conductors, capacitors and batteries.

Also there have been various types of methods used to store power including the use of high speed flywheels. Flywheels have long been used for storing mechanical power. These devices are designed to withstand forces associated with rotational rates of several thousand of revolutions per minute. The forces associated with these high speeds are destructive in nature and relatively minor structural defects can cause catastrophic failures.

In U.S. Pat. Nos. 4,509,006 and 4,546,264 the subject inventor discloses alternate energy storage systems for storing both mechanical and electrical energy in different types of land and space environments. The subject invention is a substantial improvement and an extension of the state of the art energy storage systems.

SUMMARY OF THE INVENTION

The subject variable inertia energy storage system provides a means to store mechanical energy at reduced rpms. Further, the system is adaptable for land use or on mobile vehicles such as a truck, a train, a boat and other types of mobile equipment.

The storage system includes an enclosed circular housing disposed on a mounted base. A vacuum system may be applied to the enclosed housing for reducing pressure on the equipment therein. A rotatable central hub is mounted inside the housing and includes a plurality of equally spaced spokes extending outwardly therefrom. A movable mass is mounted on each of the spokes. A reversible drive motor for moving the mass along the length of each spoke is attached to one end of each spoke. A structural ring or hoop is disposed inside the housing and adjacent the outwardly extending ends of the spokes. The hoop is adapted for receiving rotor-mounted motor/generator elements thereon and complementary motor/generator elements are mounted on the inner periphery of the housing adjacent the hoop for generating electricity or a rotation force at the command of an electrical controller. The controller includes an individual power controller, speed controller and vacuum pump controller for regulating the enclosed storage system.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1A:
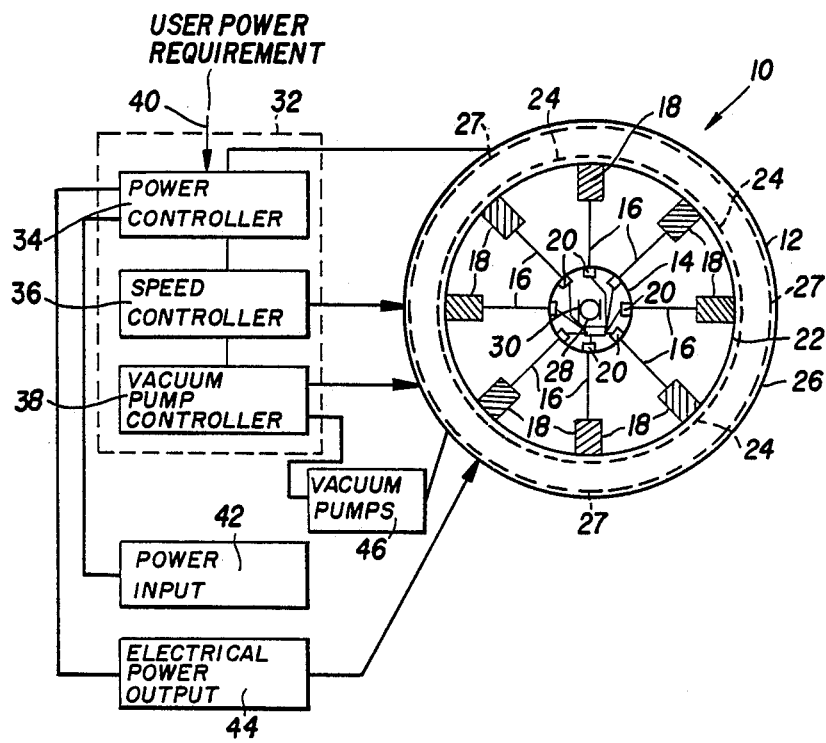
FIGS. 1A and 1B illustrate a top and side view of the storage system.
Figure 1B:
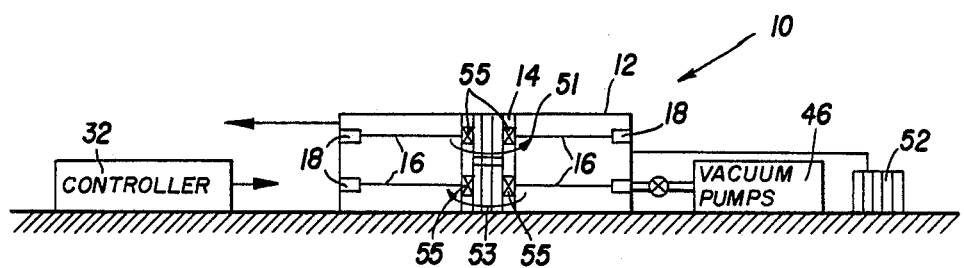
Figure 3:
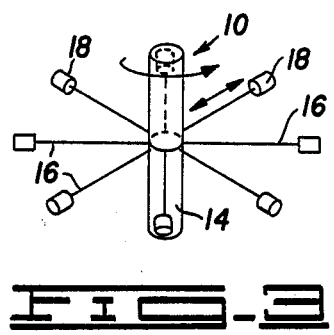
FIG. 3 illustrates a perspective view of the movable masses.

In FIGS. 1A and 1B the variable inertia energy storage system is designated by general reference numeral 10. The system 10 includes an enclosed housing 12 having a central hub 14 centered therein. The hub 14 includes a plurality of spokes 16 extending outwardly therefrom and having a movable mass 18 mounted thereon. The central hub 14 includes reversible drive motors 20 for moving the masses 18 along the length of the spokes 16. FIG. 3 shows the movement of masses 18 along spokes 16.

Disposed around the outer ends of the spokes 18 is a structural ring or hoop 22 having a plurality of rotor mounted motor/generator elements 24 mounted therearound. Also disposed in a spaced relationship around an outer periphery 26 of the housing 12 are complementary motor/generator elements 27.

Attached to the central hub 14 are slip rings 28 or an optical equivalent for control of the hub's drive mechanism. Also included are an optional slip ring power interface 30.

The storage system 10 is controlled by a central controller 32 shown in dotted lines and having a power controller 34, a speed controller 36 and a vacuum pump controller 38. The power controller 34 regulates a user power requirement indicated by arrow 40 along with providing power input 42 and electrical power output 44. The vacuum pump controller 38 is connected to vacuum pumps 46. The pumps 46 are used for drawing a vacuum in the housing 12.

Figure 2:
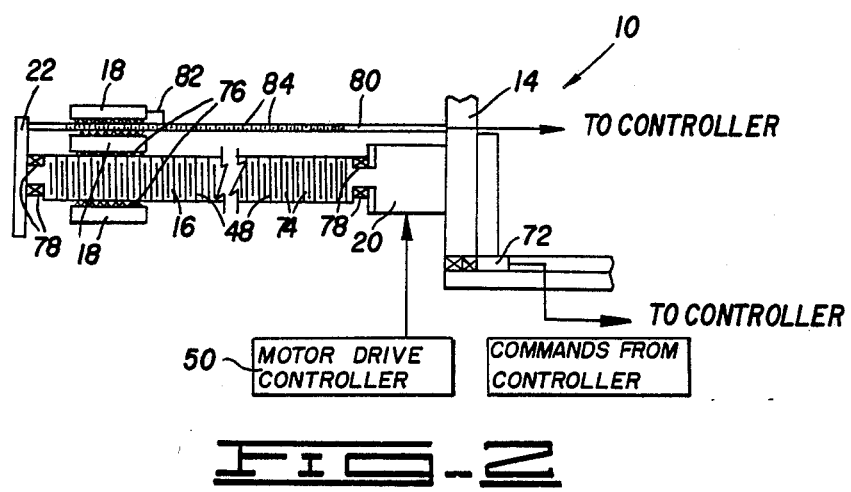
FIG. 2 illustrates an enlarged side view of an outwardly extending spoke formed as a lead screw with a movable mass and a position scale.

In operation the power controller 34 positions the movable masses 18 adjacent hub 14 for imitiation of use of system 10 in a motor configuration by energizing electrical elements 24 on hoop 22 and elements 27 on the housing 12. By sequencing the field polarity of elements 27 (or elements 24, if elements 27 are the magnet coils and elements 24 are the complementary field coils) the speed of the hub 14, spokes 16, and thus movable masses 18 is increased. To reduce the electrical power required the movable masses 18 are moved inwardly using lead screws 48 shown in FIG. 2. The lead screws 48 are part of the spokes 16. When the masses 18 are moved inwardly the masses provide a minimum moment of inertia. As the speed of the masses 18 is increased the masses 18 are moved by the reversible drive motors 20 to the outside extremity adjacent the hoop 22 at a rate commanded through a motor drive controller 50 connected to the speed controller 36.

To reduce aerodynamic loss and pressure inside the housing 12 vacuum pumps 46 are used and commanded by the vacuum pump controller 38. As an alternative as shown in FIG. 1B, in combination with the vacuum system a low molecular weight gas such as helium in helium bottles 52 can be used in the housing 12 through commands from the controller 32.

In FIG. 1B the system 10 is shown with a plurality of counter rotating spokes 16 and masses 18 indicated by arrows 51 and 53. The hub 14 also includes support bearings 55.

Changes may be made in the construction and arrangement of the parts or elements of the embodiments as described herein without departing from the spirit or scope of the invention defined in the following claims.

What is claimed is:

1. A variable inertia energy storage system for mounting on land or on a vehicle, the storage system comprising:
   an enclosed housing having an inner periphery;
   a central hub mounted in the center of the housing and rotatably mounted therein;
   a plurality of spokes extending outwardly toward the periphery of the housing;
   a plurality of solid movable masses mounted on the spokes for moving inwardly and outwardly from the central hub, said movable masses for storing inertial energy;
   drive motors attached to one end of the spokes for moving the masses along the length of the spokes; and
   a hoop disposed around and adjacent said inner periphery of the housing and attached to the ends of the spokes, the hoop having electrical motor/generator elements mounted thereon, and complementary motor/generator elements disposed on said inner housing periphery adjacent said motor generator elements for generating electricity or rotative force as the movable masses, said hoop, and said motor/generator elements are rotated past said complementary elements.

2. The system as described in claim 1 wherein the motor drives are mounted in the central hub and on one end of the spokes, the spokes having threads thereon and said masses being threadedly connected to said spokes, for moving the masses inwardly and outwardly along the length of the spokes.

3. The system as described in claim 1 further including means for evacuating air from said enclosed housing, and means for injecting into said housing a low molecular weight gas.

4. A variable inertia energy storage system for mounting on land or on a vehicle, the system comprising:
   an enclosed circular housing having a inner periphery and also having a central hub centered therein;
   a plurality of spokes equally spaced and attached to the central hub and extending outwardly therefrom, the spokes having threads thereon;
   a plurality of solid movable masses mounted on, and engaged with, the threads of the spokes and movable along the length of the spokes, said movable masses for inertial energy storage;
   drive motors attached to the central hub and one end of the spokes for rotating the spokes and moving the masses along the length of the spokes;
   a structural hoop mounted adjacent the periphery of the housing and attached to the other ends of the spokes, the hoop having a plurality of motor/generator elements mounted thereon a plurality of complementary motor/generator elements mounted on said housing inner periphery adjacent said motor/generator elements for generating electricity or rotational force as the movable masses said hoop, and said motor/generator elements are rotated thereby; and
   a power controller connected to the drive motors for controlling the motors for moving the masses along the length of the spokes and controlling the inertia of the storage system.

5. The system as described in claim 4 further including means for evacuating air from said enclosed housing, and means for injecting into said housing a low molecular weight gas.

* * * * *